United States Patent [19]

Yamanashi

[11] 4,090,678
[45] May 23, 1978

[54] SAFETY BELT LOCKING DEVICE

[75] Inventor: Chusaku Yamanashi, Tokyo, Japan

[73] Assignee: Fuji Kiko Kabushiki Kaisha, Tokyo, Japan

[21] Appl. No.: 720,617

[22] Filed: Sep. 3, 1976

[30] Foreign Application Priority Data

Nov. 14, 1975 Japan .................. 50-137046

[51] Int. Cl.² ............ A62B 35/02; B65H 75/48
[52] U.S. Cl. .............................. 242/107.4 A
[58] Field of Search ........... 242/107.4 R, 107.4 E; 297/388; 280/744-747

[56] References Cited

U.S. PATENT DOCUMENTS

| | | | |
|---|---|---|---|
| 3,578,260 | 5/1971 | Kell | 242/107.4 A |
| 3,838,832 | 10/1974 | Romanzi et al. | 242/107.4 A |
| 3,901,459 | 8/1975 | Romanzi et al. | 242/107.4 A |
| 3,923,269 | 12/1975 | Kell | 242/107.4 A |

FOREIGN PATENT DOCUMENTS 1,356,257   6/1974   United Kingdom ......... 242/107.4 A Primary Examiner—Harvey C. Hornsby
Assistant Examiner—John M. Jillions
Attorney, Agent, or Firm—Haseltine, Lake & Waters

[57] ABSTRACT

A safety belt locking device for a safety belt retractor having a shaft rotatably mounted on a frame is provided. The safety belt locking device includes a velocity change sensor for sensing a velocity change of the vehicle, a lever for transferring the velocity change to a locking mechanism for locking a rapid protraction of the safety belt. The locking mechanism comprises a ratchet wheel being fixedly mounted on the shaft, a cam plate being rotatably mounted on the shaft while being disposed adjacent the ratchet wheel, the cam plate having a bifurcated portion defining a space and a guide member at its one side, a L-shaped latch having a long leg slidably held by the guide member and a short leg being disposed engageable with the teeth of the ratchet wheel, and a ratchet pawl with a pair of oppositely outwardly extending arms being rotatably mounted on the frame, one of the arms being placed in the place defined by the bifurcated portion while the other being disposed engageable with the teeth of the ratchet wheel.

5 Claims, 6 Drawing Figures

SAFETY BELT LOCKING DEVICE

BACKGROUND OF THE INVENTION

1. Field of the Invention

The present invention relates generally to a safety belt retractor and, more particularly, to a safety belt locking device used with a safety belt retractor for locking the protraction of the safety belt when the vehicle suddenly stops.

2. Description of the Prior Art

Generally, vehicles such as automobiles or airplanes are provided at the seats with safety belt retractors for ensuring the safety of the passengers. Such vehicles meet a sudden fall of the vehicle velocity when they suddenly stop or clash with something in accident. In this case, an inertia forcebly moves the passengers forwardly to possibly clash with the handle or front glass. Thus, at this time, such a sudden velocity change must be simultaneously sensed for locking the violent forward movement of the passengers in order to avoid such a danger. Various locking devices have thus far developed. The present applicant has been proposed one of the conventional locking devices entitled "Belt Retractor" bearing Ser. No. 624,827. In this invention, the sudden change of the vehicle velocity is sensed by means of an inertia member, and then is transmitted to the clutch mechanism provided with another inertia member. With a temporary stop of the latter inertia member, the ratchet wheel interlocking with the safety belt is locked to prevent a sudden protraction of the safety belt. According to this invention, the protraction of the safety belt is reliably locked. The locking device of the invention, however, employs a complex mechanism for performing the locking function, and thus is problematic in cost and reliability.

SUMMARY OF THE INVENTION

Accordingly, an object of the invention is to provide a safety belt locking device used with a safety belt retractor with a simple construction and a high reliability.

Another object of the invention is to provide a safety belt locking device used with a safety belt retractor having a pair of ratchet wheels, thus enhancing the reliability.

Still another object of the invention is to provide a safety belt locking device used with a safety belt retractor adaptable for any form of the sensor for vehicle velocity change.

According to an important feature of the invention, a safety belt locking device for a safety belt retractor having a shaft rotatably mounted on a frame is provided. The safety belt locking device includes means for detecting a velocity change of the vehicle. The means may be any form of the sensor for vehicular velocity change. The locking device further includes means for locking a rapid protraction of the safety belt and a means for transferring the velocity change of the vehicle to the locking means. The locking means comprises a ratchet wheel with teeth on the periphery being fixedly mounted on the shaft, a cam plate being rotatably mounted on the shaft while being disposed adjacent the ratchet wheel, the cam plate having a bifurcated portion defining a space, and a guide member on one side of the cam plate, a L-shaped latch having a long leg slidably held by the guide member and a short leg which engages the teeth of the ratchet wheel, when the detecting means detects a sudden change of the vehicle velocity, through the movement of the L-shaped latch with a guide of the long leg which the movement is caused by the transferring means driven by the detecting means in such a case, and a ratchet pawl with a pair of oppositely outwardly extending arms being rotatably mounted on the frame, one of the arms being placed in the space defined by the bifurcated portion while the other being disposed engageable with the teeth of the ratchet, whereby when a sudden change of the vehicle velocity occurs, said detecting means detects such a sudden change of velocity to drive the transferring means, and then the transferring means moves the L-shaped latch to engage at the short leg of the L-shaped member with the teeth of the ratchet wheel and hence rotation of the ratchet wheel drives the cam plate to rotate the ratchet pawl to engage at the other arm of the ratchet pawl with the teeth of the ratchet wheel, resulting in the lock of the protraction of the safety belt.

In another important feature of the invention, the safety belt locking device employs a couple of ratchet wheels; one is engageable with the short leg of the L-shaped latch and the other engageable with one of the arms of the ratchet pawl.

Other objects and features of the invention will be apparent from the following description in connection with the accompanying drawings, in which:

DESCRIPTION OF THE PREFERRED EMBODIMENT

Figure 1:
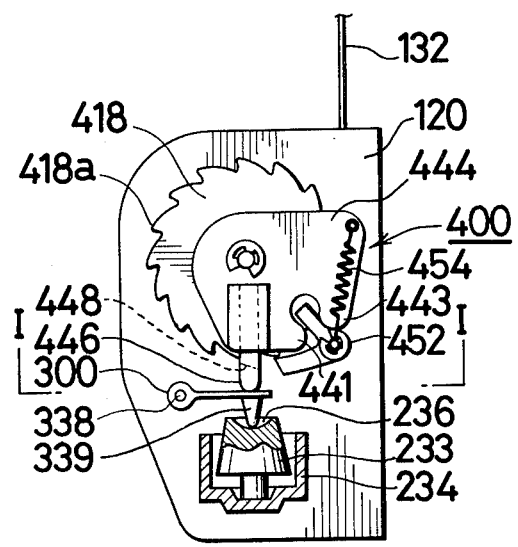
FIG. 1 shows a side view of a safety belt retractor including a safety belt locking device according to the present invention.
Figure 2:
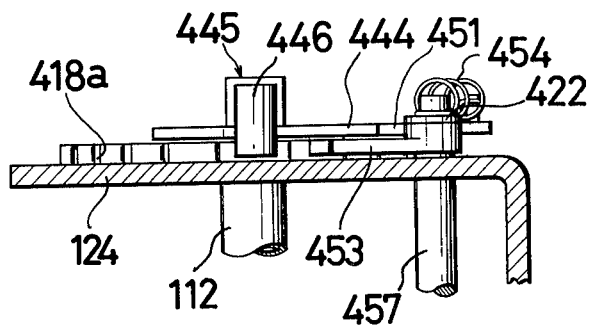
FIG. 2 is a partial cross sectional view taken along the line I—I of FIG. 1.
Figure 3:
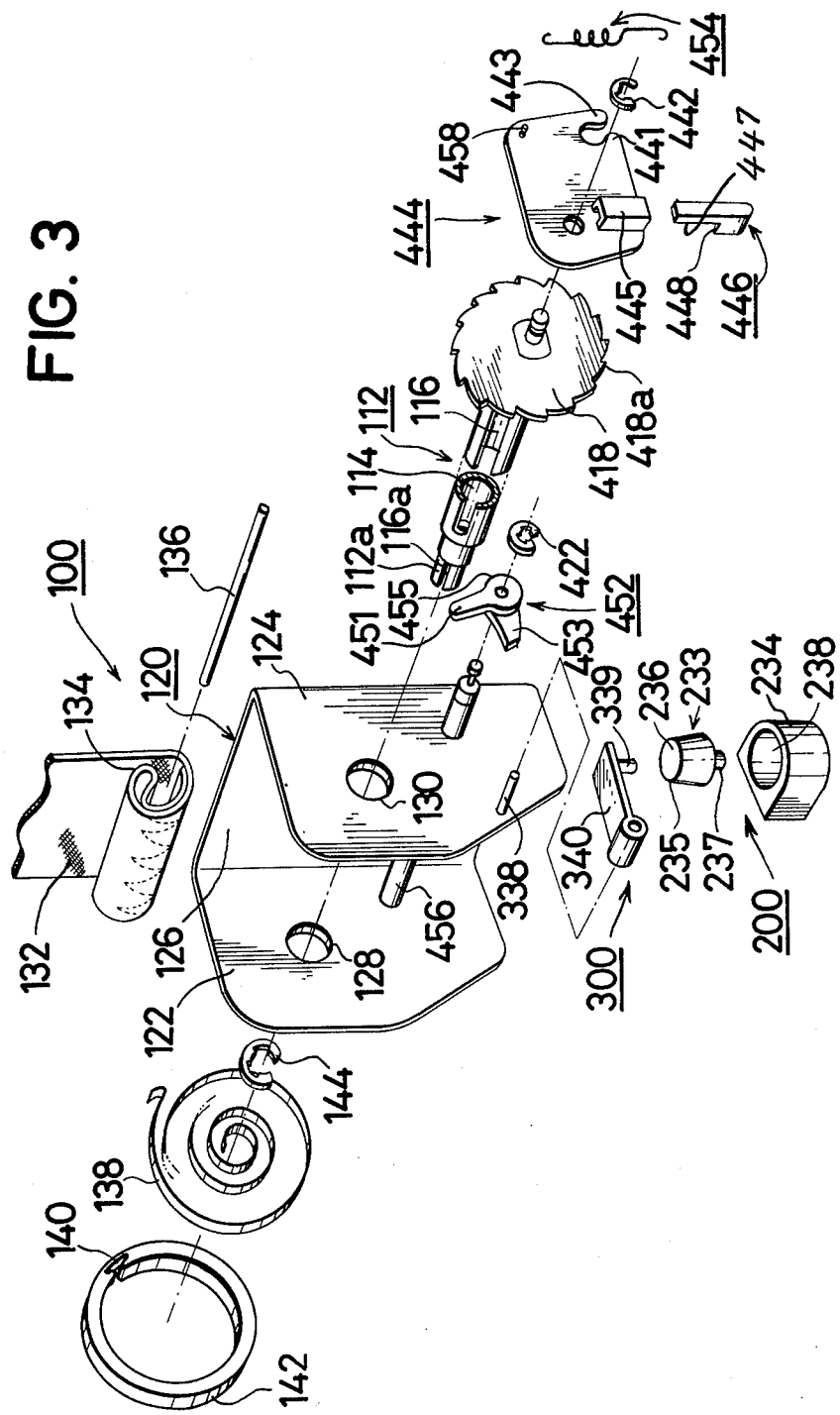
FIG. 3 is an exploded view showing in detail the various parts of the safety belt retractor of FIG. 1.

A safety belt retractor into which a safety belt locking device of the invention is incorporated may be of the type having a shaft rotatably mounted on a frame. Referring now to the drawings, particularly FIGS. 1 to 3, the safety belt retractor generally designated by reference numeral 100 comprises a shaft 112 having a hollow 114 therein and a slot 116 elongated in the axial direction of the shaft 112. The shaft 112 is provided at one end with an elongation 112a narrowed in diameter and with a slit 116a, while at the other end with a ratchet wheel 418 having a number of teeth 418a arranged around the periphery thereof. The primary portion of the shaft 112 is included within a frame 120 formed with a rear wall 126 and spaced apart side walls 122 and 124 each having an aperture 128, 130. The side walls 122 and 124 serve as a support for the shaft 112. The slot 116 of the primary portion of the shaft 112 receives one end of a safety belt 132. More precisely, the hollow 114 of the shaft 112 receives the looped end 134 for fixing the safety belt 132 so as to permit the protraction and retraction of the safety belt with respect to the primary portion of the shaft 112. The insertion of the pin 136 is made through the opening (not shown) formed at the narrowed end 112a and through which the hollow continues to the outside.

The narrowed end 112a of the shaft 112 extends through the aperture 128 in the frame wall 122. The slot 112a receives the inner end of a helical flat spring 138. The outer end of the spring 138 is hooked to a groove 140 formed at the inner surface of a spring closure 142 which encloses and confines the spring 138. The flat spring 138 exerts a force on the shaft 112 in the direction of the belt retraction. The other end of the shaft 112 extends through the aperture 130 in the side wall 124. As previously stated, the ratchet wheel 418 is mounted on the shaft 112 on the outside of the side wall 124 and is disposed for rotation together with the shaft. The fixing ring 144 is firmly fixed around the shaft 112 at the outside of the side wall 124 but close to the side wall 124, for preventing the shaft 112 from dropping out of the frame 120.

To achieve the locking of the belt protraction at an emergency condition, a velocity change of the vehicle must be sensed by means of a suitable means, for example, a velocity change sensor 200. In this specification, two types of such a sensor will be given; one is shown in FIGS. 1 and 3, and the other in FIG. 4.

A first example of the velocity change sensor will be discussed with reference to FIGS. 1 and 2. In the figures, the velocity change sensor designated by reference numeral 200 comprises a pendulum 233 and a pendulum holder 234. The pendulum 233 having a head portion 235 and a post portion 237 seats on a depression 238 in the pendulum holder 234 in a manner that the pendulum freely pivots about its base in any direction away from a vertical axis drawn through the post portion 237. The side wall 234 is mounted on the side wall 124 by means of suitable fixing means, for example, screws (not shown). The head portion 235 tapers outwardly from its base end toward the head portion. That is, it is shaped like a cone cut away its top portion. The top surface 236 of the head portion 235 has a generally circular recess including a bottom wall tapering rapidly outwardly and upwardly from the center thereof to define a camming surface.

With such a construction, the velocity change sensor 200 senses a change of the vehicle velocity through means of inclination of the pendulum 233 which is caused by the inertia of the pendulum when the vehicle velocity changes.

In this manner, the velocity change of the vehicle is transformed into the corresponding inclination of the pendulum 233.

Figure 4:
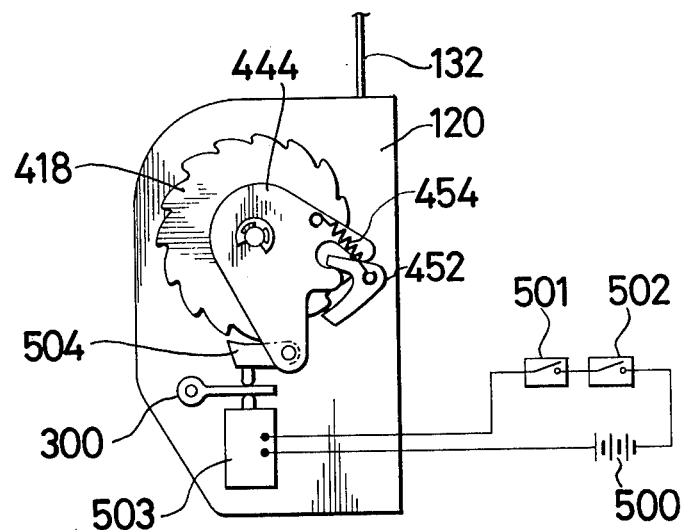
FIG. 4 is a side view of a safety belt retractor using another embodiment of the safety belt locking device of the invention.

A second example of the velocity change sensor is illustrated in FIG. 4. In this example, the so-called G sensor is used instead of the pendulum type sensor of the previous case. In the figure, a drive circuit comprises a solenoid 503, a G-sensor 501, a manual switch 502, and a battery 500. The reference numeral 504 designates a pawl member one end of which is rotatably mounted on the lower end of the cam plate 444. The other end of the pawl member 504 is provided at the lower side with a projection in contact with the free end of the lever 300. The solenoid 503 serves as an actuator in an emergency condition for engaging the pawl member 504 with the ratchet wheel 418, through the lever 300 of the transferring member.

In operation, when a rapid deceleration of the vehicle occurs, the G-sensor detects it to close the drive circuit and actuate the solenoid 503. The actuation of the solenoid 503 pushes up the lever 300 and then the pawl member 504 which in turn engages with the ratchet wheel 418. By the engagement, the ratchet wheel 418 couples with the cam plate 444 to lock the sudden protraction of the safety belt, as mentioned above.

The inclination of the pendulum is in turn transmitted to the safety belt locking device according to this invention, through a transmitting means. In this example, the transmitting means takes a form of a lever 300.

The lever 300 is pivotally mounted on a pin 338 projecting from the side wall 124 of the frame 120. The free end of the lever 300 extends over the pendulum 233. A contact element 339 depends from the bottom surface of the lever 300 and slidably contacts with the circular recess 236 of the pendulum 233. Thus, the lever 300 may be displaced for movement responsive to the inclination of the pendulum 233. A top surface portion of the lever 300 is disposed in contact with a bottom surface portion of the latch 446.

A safety belt locking device designated by reference numeral 400 serves to lock the protraction of the safety belt 132 in response to a rapid change of the vehicle velocity transmitted thereto from the velocity change sensor 200 through the lever 300. The safety belt locking device generally comprises a cam plate 444, a L-shaped latch 446, and a ratchet pawl 452. The ratchet pawl 452 has a pair of oppositely outwardly extending arms 451 and 453, and is turnable to a position where one of the arms engages with the teeth 418a on the periphery of the ratchet wheel 418. The pin 456 arranged in parallel with the shaft 112 is fixedly mounted on both the side walls 122 and 124 of the frame 120. One end of the pin 456 extends beyond the side wall 124 to form an extension 457 on which the latch pawl 452 is keyed for turning movement. For preventing the dropping out of the ratchet pawl 452, a fixing ring 422 is fixed at the top end of the extension 457 projecting beyond the ratchet pawl 452. One of the arms 453 of the latch pawl 452 to be engageable with the teeth 418a of the ratchet wheel 418, while the other designated by numeral 451 serves as a cam follower, as will be described later. The ratchet pawl 452 is preferably formed as a unity with the arms 451 and 453 angularly spaced at a predetermined angle.

The cam plate 444 is rotatably mounted on the shaft 112 adjacent the right side of the ratchet wheel 418, with a fixing ring 442 fixed at the outermost thereof for preventing the slipping-out of the cam plate. The cam plate also is provided on the right side with a latch holder 445 which slidably holds therein a latch arm 447 of the latch 446. The cam plate 444 is bifurcated at one corner to have a pair of leg portions 441 and 443. The incurved space defined by the two legs 441 and 443 receives the arm or cam follower 451. The leg 443 constantly engages with the annular shoulder 455 of the cam follower 451, for positioning the cam plate 444 in place. Similarly, the leg 441 normally comes in contact with the lower surface of the cam follower 451 and pushes up the cam follower 451 to turn the ratchet pawl 452 clockwise, when the cam plate rotates about the shaft 112 counterclockwise. Such directional rotation of the cam plate 444 takes place when the vehicle suddenly stops, as will be described later. Biasing means such as a coil spring 454 is connected at one end to the extension 457 of th pin 456 extending outwardly beyond the cam follower 451 and the other end to a pin 458 projecting outwardly from the cam plate 444. The coil spring 454 places a biasing force on the cam plate 444 urging it toward the cam follower 451.

With such a construction, since the pendulum is upright when the vehicle is running, the L-shaped latch 446 and the lever 300 lie downwardly due to their self-weight. Under this condition, there is no coupling of the ratchet wheel 418 with the cam plate 444, permitting free protraction and retraction of the safety belt. For example, a vehicle clashes head-on with the other vehicle and the vehicle experiences a deceleration larger than a predetermined magnitude, the pendulum inclines due to the deceleration and then the lever 300 rotates counterclockwise as viewed in the drawing. With the rotation of the lever 300, the L-shaped latch 446 slides up so that the short leg 448 engages with the teeth of the ratchet wheel 418. As a result, the ratchet wheel 418 couples with the cam plate 444. At this time, the passenger wearing the safety belt moves forward due to the inertia, and thus the safety belt is protracted from the safety belt retractor and hence the ratchet wheel and the cam plate integrally rotate counterclockwise. With this rotation, the ratchet pawl is rotated clockwise by means of the leg portion 441 of the cam plate 444 and is in mesh with the teeth 418a of the ratchet wheel 418, thereby locking the protraction of the safety belt.

In the example heretofore described, the ratchet wheel 418 in mesh with the L-shaped latch and the ratchet pawl arm 453, is made of hard material such as steel. For this, the ratchet wheel sometimes kicks off the L-shaped latch and it is difficult to shape the desired teeth configuration.

Figure 5:
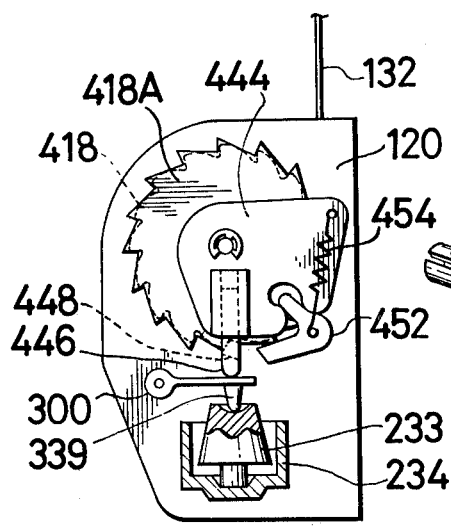
FIG. 5 is a side view of the safety belt locking device of the invention, which uses an auxiliary ratchet wheel.
Figure 6:
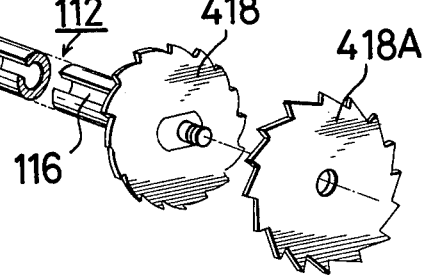
FIG. 6 is a fragmental exploded view showing the ratchet wheels of FIG. 5.

For avoiding these problems, another embodiment of the invention is proposed and will be given referring to FIGS. 5 and 6. In this embodiment, an auxiliary ratchet wheel 418A is additionally provided adjacent the ratchet wheel 418, being fixed on the end of the shaft 112, with a fixed phase relation to the ratchet wheel 418. The auxiliary ratchet wheel 418A is used exclusively for being in mesh with the short leg 448 of the L-shaped latch 446. The ratchet wheel 418A is made of relatively soft material such as plastics, with the same number of the teeth thereof as that of the ratchet wheel 418 and with the diameter slightly larger than that of the ratchet wheel 418. The use of the soft material permits ease of the teeth shaping, thus ensuring the meshing of the ratchet wheel 418A with the L-shaped latch 446.

While the embodiments heretofore described are of the type in which the safety belt retractor is provided at one side with the safety belt locking device, it is a matter of course that the retractor is provided at the both sides with the locking devices, if necessary.

Further, it is preferable that the lever and the L-shaped latch are made of light weight material such as plastic, for enhancing the sensitivity to the pendulum motion.

What is claimed is:

1. In combination in a safety belt locking device for a safety belt retractor adapted to be mounted on a vehicle, said retractor including a frame and a shaft rotatably mounted on said frame; means for detecting a velocity change of the vehicle; means for locking a rapid protraction of the safety belt and; said locking means comprising a ratchet wheel with teeth on the periphery and being fixedly mounted on said shaft, a cam plate being rotatably mounted on said shaft while being disposed adjacent said ratchet wheel, said cam plate having a bifurcated portion defining a space, and a guide member provided on one side of said cam plate, a L-shaped latch having a long leg slidably held by said guide member and a short leg which is engageable with the teeth of said ratchet wheel, a transferring means responsive to a detected change in vehicle velocity by said detecting means for moving said L-shaped latch, and a ratchet pawl with a pair of oppositely outwardly extending arms being rotatably mounted on the frame, one of said arms being placed in said space defined by said bifurcated portion while the other being disposed engageable with the teeth of said ratchet wheel, whereby, when a sudden change of the vehicle velocity occurs, said detecting means being adapted to detect such a sudden change and having means for driving said transferring means causing movement of said L-shaped latch toward said short leg and engagement with the teeth of said ratchet wheel, to thereby rotate said cam plate through said ratchet wheel upon subsequent protraction of said belt causing engagement of the other arm of said ratchet pawl with said ratchet wheel, resulting in the locking of the safety belt.

2. The combination set forth in claim 1 characterized in that said detecting means is a pendulum.

3. The invention set forth in claim 2, characterized in that said transferring means is a lever like member which normally contacts one side of said short leg of said L-shaped member while at the other side with said pendulum and, when a sudden change of the vehicle velocity occurs, said pendulum causes said lever like member to move said L-shaped latch so that said short leg engages the teeth of said ratchet wheel.

4. The invention set forth in claim 1, characterized in that said detecting means is a combination of electrical sensing means for sensing a sudden change of the vehicle velocity and solenoid means for mechanically driving said transferring means in response to the electrical information about the sudden velocity change from said electrical sensing means.

5. In combination in a safety belt locking device for a safety belt retractor adapted to be mounted on a vehicle; said retractor including a frame and a shaft rotatably mounted on said frame; detecting means for detecting a velocity change of the vehicle; means for locking a rapid protraction of the safety belt; said locking means comprising first and second ratchet wheels each with teeth on their respective peripheries and being fixedly mounted on said shaft, a cam plate being rotatably mounted on said shaft while being disposed adjacent said second ratchet wheel, said cam plate having a bifurcated portion defining a space, and a guide member provided on one side of said cam plate, an L-shaped latch having a long leg slidably held by said guide member and a short leg which is engageable with the teeth of said second ratchet wheel, a transferring means responsive to a detected change in vehicle velocity by said detecting means for moving said L-shaped latch and a ratchet pawl with a pair of oppositely outwardly extending arms being rotatably mounted on the frame, one of said arms being placed in said space defined by said bifurcated portion while the other being disposed engageable with said first ratchet wheel, whereby, when a sudden change of the vehicle velocity occurs, said transferring means moves said L-shaped latch to cause engagement of said short leg of said L-shaped member with said ratchet wheel and rotation of said cam plate through said ratchet wheel upon subsequent protraction of said belt to thereby rotate said ratchet pawl, causing engagement of the other arm with the teeth of said second ratchet wheel, resulting in the locking of the safety belt.

* * * * *